July 15, 1958     E. A. G. C. BRUCE     2,843,424
SPRAYING BOOMS
Filed Oct. 27, 1954     2 Sheets-Sheet 1
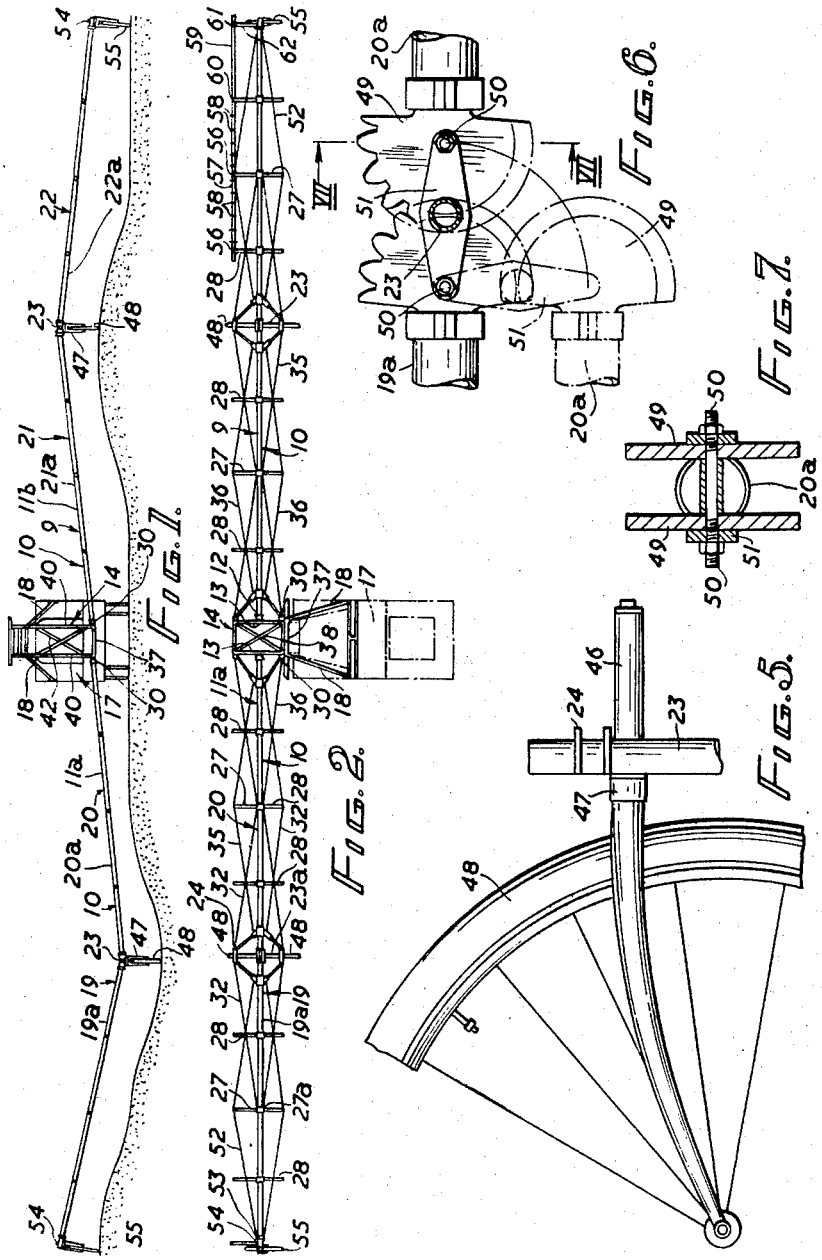
INVENTOR
EWEN ANTHONY GUY CAMERON BRUCE
BY Young, Emery & Thompson
ATTORNEYS

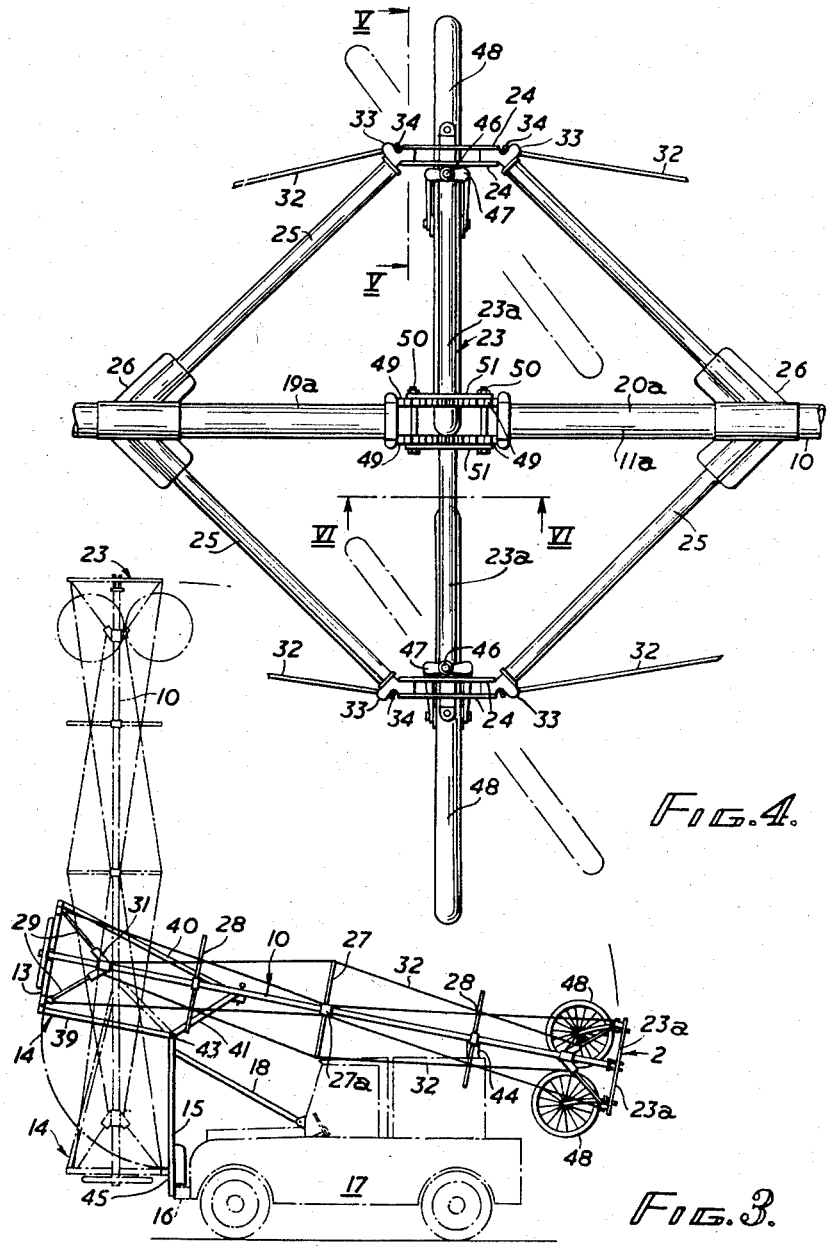

United States Patent Office 2,843,424
Patented July 15, 1958

2,843,424
SPRAYING BOOMS

Ewen Anthony Guy Cameron Bruce, Cheltenham, England, assignor to Harry William Weston, Cheltenham, England Application October 27, 1954, Serial No. 465,054

Claims priority, application Great Britain October 30, 1953

7 Claims. (Cl. 299—30)

This invention relates to spraying booms adapted to be moved over the land for the spraying of crops or the like.

The hauling of conventional spraying booms over fields of growing crops sometimes causes damage to the crops as a result of the tracks made by the towing vehicle and still only results in the spraying of a relatively narrow swath, the maximum width of conventional spraying booms being limited by considerations of weight, negotiation of field gates and other factors. With a view to avoiding the possible damage to crops by the wheel tracks of the towing vehicle as already mentioned, it has been proposed to spray crops with the aid of aircraft, the spraying boom or other spraying device being attached to the aircraft which is flown back and forth across the area to be sprayed. However, crop-spraying with the aid of aircraft is an expensive undertaking and involves the toleration of inaccuracies due to drift of the spraying liquid with the risk of neighbouring crops being sprayed. Moreover, of course, crop spraying from the air is subject to flying weather restrictions.

The main object of the present invention is to enable crop spraying to be affected in a less expensive, more rapid and more accurate manner than is possible by aircraft and yet in a manner which will be very much more rapid than the conventional method of spraying by land vehicle, doing less damage to the crops by wheel tracks and requiring less fuel and at considerably less labour cost per unit area covered.

A further object is to provide a spraying boom adapted to be carried by, or attached to, a land vehicle and project transversely therefrom, said spraying boom comprising, on one side of the vehicle, a portion which itself comprises a plurality of sections hinged together for relative pivoting movement in a substantially vertical plane only and provided with ground-engaging wheels which support the sections at the hinge points whereby the boom is enabled generally to follow the transverse land contours over which it is running.

Preferably the boom is hingedly attached to the vehicle, no ground-engaging wheel being provided at such hinged attachment point. The hinge points at which wheels are provided preferably comprise pinions carried by the respective sections and in mesh with each other so that each hinge constitutes a geared knuckle, the respective wheel-mounting axis always bisecting the angle formed between the sections when relative turning movement occurs about such hinges.

The hinges by which the various sections are connected to each other are of such construction that the boom may also collapse or fold about such hinges in the same said substantially vertical plane to enable the boom sections to lie substantially alongside each other.

If desired, alternate hinges may be arranged so that they are opposite in action during the collapsing movement, during which the boom sections form the sides of transversely collapsing triangles. When more than two boom sections are disposed on one side of the vehicle the various sections are arranged to collapse or fold in a zig-zag manner.

Preferably, hinged attachment means, adapted to be carried by the vehicle, are provided at or about the centre of the boom which is arranged so that two symmetrical portions thereof are disposed one on each side of the vehicle.

The said attachment means are preferably arranged so that the collapsed or folded boom can be turned in a vertical plane, normal to said substantially vertical plane in which the boom collapses or folds, to a stowed position in which it is arranged substantially horizontally, or at a slight angle to the horizontal, over the top of the vehicle for transport purposes in the manner of a fire escape. All the boom sections are preferably of equal length.

Each section of the boom preferably comprises a longitudinal spar having a transverse truss at each end and one or more transverse spreaders intermediate such ends with bracing elements extending smoewhat diagonally between the halves of the end trusses lying on each side of the longitudinal spar in order to afford lateral rigidity to the section in a horizontal plane. Such bracing elements preferably comprise wires or rods provided with tensioning means.

A preferred construction of spraying boom arranged to extend on each side of the vehicle to which it is adapted to be attached will now be described, by way of example, with reference to the accompanying drawings, in which:

Figure 1 is a front elevation of the spraying boom and vehicle, the spraying boom being shown in its extended position and following the uneven contours of the ground, Figure 2 is a plan view of the arrangement shown in Figure 1, Figure 3 is a side elevation of the spraying boom in its collapsed or folded state, the spraying boom being shown in broken lines in the vertical position into which it is first collapsed and in full lines in the stowed position, to which it is turned after collapse, in which position the axes of the boom sections are inclined rearwardly and downwardly at a small angle to the horizontal, Figure 4 is a plan view on a larger scale of the hinge arrangement by which adjacent ends of two adjacent sections of the boom are connected to each other, Figure 5 is a broken detail view of a pivot head and forks which carry one of the wheels by which the spraying boom is supported, Figure 6 is a detail view on the line VI—VI of Figure 4 and shows the hinges both in their extended and folded positions, and Figure 7 is a detail view on the line VII—VII of Figure 6.

Referring to Figures 1 to 4 of the drawings, the spraying boom 9 illustrated therein comprises a longitudinal spar 10 of light weight, for example constructed of light alloy tubing. The spar is constructed in two portions 11a, 11b each of which is attached at its inner end by a hinge 12 to a horizontal lower side member 13 of a central carrying structure or cage 14. The latter projects forwardly from, and is carried by, vertical support members 15, Figure 3, attached at their lower ends to the front bumper 16 of a vehicle 17, such as an ordinary four-wheeled farm car, the upper end of each support member being secured by a rearwardly sloping bracing tube 18 attached at its opposite end to the vehicle.

Each of the portions 11a, 11b of the spar 10 is identical so that the boom 9 is symmetrical about its centre, and each portion is built up in sections 19, 20 and 21, 22 each of which in turn comprises a longitudinal spar 19a, 20a and 21a, 22a of the light alloy tubing, the various sections being placed substantially end to end so that together they form the complete spar 10. In the example illustrated there are two sections 19, 20 and 21, 22 in each portion 11a, 11b of the spar, making four sections in all, each section being, for example, approximately 20 ft. in length so that a total boom length of approximately 80 ft. results.

The two inboard sections 20, 21—one on each side—are substantially identical with each other while the two outboard sections 19, 22 are basically similar to the inboard sections but differ in minor respects therefrom in a manner to be referred to hereinafter. Each inboard and outboard section has a transverse truss 23 at their adjacent ends, the trusses between adjacent sections being common to both sections and forming hinges therebetween in a manner to be described in more detail. The trusses 23 comprise comparatively short lengths 23a, Figure 4, of light alloy tubing disposed normally to the ends of the respective spars 20a, 21a so as to project equally fore and aft from the spar and in a horizontal plane. At their forward and rearward ends the trusses 23 carry spaced parallel plates 24 between which the outer ends of rigid stays or struts 25 are mounted, the inner ends of such struts being held between gusset plates 26 secured to the spars at a short distance from their ends whereby similar triangulated constructions on each side of the spar result. An intermediate transverse truss 27, also constructed of light alloy tubing, is arranged centrally on each spar section to which it is rigidly connected by gusset plates 27a, and intermediate spreaders 28, of light alloy tubing, are arranged transversely of each spar and rigidly attached thereto between the trusses so that the length of the spar is divided into a plurality of substantially equal axial lengths.

At their inner ends the inboard sections 20, 21 of the spraying boom are provided with rigid stays or struts 29, similar to the struts 25 already described, attached at their outer ends to hinges 30 mounted one at each end of the lower side member 13 of the carrying structure or cage 14 and axially aligned with the hinges 12. The inner ends of the struts 29 are rigidly attached to the spars 20a, 21a of the respective inboard sections by gusset plates 31 so that in effect the side member 13 forms a transverse truss for the inboard ends of the spars similar in many respects to the trusses 23 at their outboard ends.

Bracing wires or rods 32 extend on each side of each spar from the gusset plates 27a of the transverse truss 27 to the outer end of the transverse truss 23, the attachment of the wires or rods to the outer ends of the trusses being effected by means of small lugs or earpieces 33, Figure 4, formed at the outer extremities of the stays or struts 25. The attachment of the ends of the bracing wires or rods 32 to the lugs 33 is effected by nuts 34 mounted on the threaded ends of the rods to enable the latter to be tightened. Similar, but oppositely inclined, bracing wires or rods 35 extend between the outer ends of the trusses 27 and the gusset plates 26 and 31, and still further bracing wires or rods 36 are arranged between the gusset plates 27a and the outer hinges 30. The bracing wires or rods cross at, and pass through holes in, the intermediate spreaders 28 and the foregoing arrangement results in a wire-braced section of extreme rigidity in a horizontal fore and aft direction.

The trusses 23 and lower side members 13 form hinged or pivot connections between the various sections enabling the sections to be folded one against the other in the vertical plane, as shown in Figure 3, the two innermost sections 20, 21 turning about the lower side members so that their outer hinge points by which they are joined to the outer sections 19, 22 move upwardly while the outer ends of the outer sections remain at normal level. When the two portions 11a, 11b of the spar are folded or collapsed all the sections lie vertically side by side and the extreme ends of the outboard sections 19, 22 lie at the normal level of the boom. With the boom 10 in this collapsed state the various sections lying side by side are disposed within the normal width of the vehicle 17 to which the boom is hitched.

As illustrated, the central carrying structure or cage 14 is fabricated from angle section material and is of rectangular plan form, the two lower side members 13 being connected at their ends by transverse members 37, Figure 2, and diagonal bracing members 38. To the rear ends of the lower side members 13 upright members 39, Figure 3, are secured, the cage 14 being completed by rearwardly and upwardly sloping front members 40, top members 41 and further diagonal bracing members 42. The cage 14 is pivotally attached at the upper end of each of the rear upright members 39 to the aforesaid vertical support members 15 by pivot pins 43 about which the cage can be swung from the boom-operative position shown in broken lines in Figure 3 to the boom-inoperative position shown in full lines in that figure. Such swinging movement of the cage 14 tips the vertically arranged collapsed or folded boom 9 to the rearwardly and downwardly inclined stowed position shown in full lines in Figure 3 in which the folded boom is disposed over the top of the vehicle for transport purposes in the manner of a collapsed fire escape and rests on a cradle 44 mounted towards the rear of the vehicle. Withdrawable pins 45 are provided to maintain the cage 14 in its vertical or boom-operative position, such pins passing through registering holes in the lower ends of the upright members 39 and support members 15.

Towards the front and rear ends of the trusses 23 a pivot head 46, Figure 5, is mounted, each head being in the form of a vertical tube extending above and below the truss and receiving a spigot portion of a fork 47 carrying a caster wheel 48, whereby the hinge points of the boom 9 are maintained at the same height above the ground at the respective points as that of the substantially central hinge points 30 of the boom, as determined by the height at which the boom is hitched to the vehicle 17. The wheels 48 may be of quite light construction; in the example illustrated they are cycle wheels carried in ordinary bicycle front forks the upper portion of which forms the spigot turning in the pivot head 46 already described. It will be appreciated that the two wheels 48 on each truss, being arranged one behind the other tandem fashion, prevent twisting loads being imposed on the inner sections 20, 21 of the spars and maintain the respective trusses parallel with the ground.

In order to enable relative angular movement to occur between the various sections of the boom about the wheeled hinge points and trusses 23 so that the hinge points may rise or fall to enable the boom 9 to follow the contours of the ground while travelling over the land and yet be properly supported by the wheels 48, it is essential that the axes about which the wheel forks 47 pivot should always bisect the varying angles formed between the respective adjacent sections. This is achieved, as shown in Figures 4, 6 and 7, by effecting the hinging of the sections 19, 20 and 21, 22 together in the manner of geared knuckle joints carried by the respective trusses 23. For this purpose each spar end terminating at a wheeled hinge point rigidly carries a pair of aligned and spaced pinions or toothed segments 49, Figure 6, which have a transverse pivot pin 50 passing through their centres. The trusses 23 are broken at their centres and have inwardly presented flanges or plates 51 at the gap formed between the inner ends of the forward and rearward portions 23a of the trusses, the gap being formed by bolting the plates together with the aid of the pins 50 which form distance pieces and at the same time constitute the pivot pins for the plates which are thus hinged to the respective sections at points arranged one on each side of the point about which hinged movement of the respective sections takes place. The respective pairs of pinions 49 mesh with each other and lie within the aforesaid gap between the plates 51. The hinge arrangement is most clearly shown in Figure 6 from which it will be appreciated that as the sections 23a of the truss 23 carrying the pivot heads 46 are rigidly secured to the plates 51, the axes of such pivot heads always bisect the angle formed between the spar sections 19a, 20a or 21a, 22a.

The two outboard sections 19, 22 of the boom 9 have a hinge truss 23 only at their inner ends, the bracing wires or rods and the remaining truss 27 and spreaders 28 being arranged substantially as already described except that the outer ends of the outermost rods 52 are secured to collars 53 secured to the extremities of the spars 19a, 22a forming such outboard sections. Near the extremities of the spars 19a, 22a forming the outboard sections similar pivot heads 54 to the pivot heads 53 are provided for caster wheels 55 of the kind already described.

It will be appreciated that, although a boom having four sections has been described, the invention is not limited to booms having this number of sections. For example, eight sections may be provided—six inboard and two outboard—in which case the inboard and outboard sections of the boom are of the respective constructions already described, there being six pairs of tandem ground wheels and two outboard wheels. When such a boom is folded or collapsed, the two innermost sections turn about the hinges 12, so that their outer hinge points move upwardly while the hinge points at the outer ends of the next outer sections remain at normal level. The hinge points at the other ends of the next outer sections again move upwardly so that each of the two boom portions assumes a zig-zag form, the wheel mountings, the vertical axes of which always bisect the angle formed between the respective sections, lying parallel to the sections in their collapsed position.

If desired, the spraying boom 9 may be constructed in two portions hinged together at the centre of the axial length of the boom instead of having the carrying structure or cage 14 described above interposed between the two portions of the boom. Whichever form of construction is employed, the spray bar 57 extends at least from the centre of the boom to the outer end thereof, there being no necessity to provide a separate central spray bar as is customary in known forms of spraying booms.

At the forward ends of the trusses 23 and 27 and the spreaders 28 clips or brackets 56 are provided for the attachment of a spray bar 57 in the form of a hose, only a portion of which is shown in Figure 2, carrying the spraying nozzles 58 to which spraying liquid is supplied from a tank carried by the towing vehicle 17, for example. A flexible rubber hose may be employed and is preferably in two separate lengths each extending from the axial centre of the boom 9 to one extremity thereof. The flexible spray hose 67 is attached to the boom by the aforesaid clips and has the nozzles 58 fitted thereover at the desired spacing, such nozzles preferably merely comprising narrow annular collars which fit tightly over the hose and have a radial jet orifice therein in register with an equivalent orifice in the hose.

At the outer end of the outer sections 19, 22 a rigid tubular bar 59 is provided which is pivotally connected to the forward end of the outer spreader 28 by a swivelling clip 60 and is carried in a spring clip 61 arranged at the forward end of a forwardly projecting strut 62 secured to the end of the respective outer spar section. The bar 59 projects beyond the outboard end of the boom 9 and forms an antenna so that if the vehicle 17 is driven too close to an obstruction, the outer end of the bar strikes such obstruction before the boom and swings rearwardly about the clip 60 without being damaged and as a warning indication to the operator. Provision is made on the bar 59 for the hose 57 to be clipped thereto.

I claim:

1. A spraying boom adapted to be carried by a land vehicle so as to project transversely therefrom, said spraying boom comprising, on one side of the vehicle, a portion which itself comprises a plurality of sections, hinge means connecting adjacent ends of said sections to each other to permit relative movement between said sections only in the common substantially vertical plane containing said sections, said hinge means confining movement between said sections to said plane but allowing relative angular movement between said sections in said plane about said hinge means to enable said hinge means to rise or fall, and a ground engaging wheel to support said sections at said hinge means whereby the boom is enabled generally to follow the land contours over which it is running and remain rigid in the direction of movement of the boom.

2. A spraying boom adapted to be carried by a land vehicle so as to project transversely from the latter, said spraying boom comprising, on one side of the vehicle, a portion which itself comprises a plurality of sections, hinge means connecting adjacent ends of said sections to each other to permit relative movement between said sections only in the common substantially vertical plane containing said sections, said hinge means confining movement between said sections to said plane but allowing relative angular movement between said sections in said plane about said hinge means to enable said hinge means to rise or fall, ground engaging wheels which support the sections at each of the hinges, a mounting for each ground-engaging wheel which is hinged for movement in said vertical plane relatively to each respective section, and means hingedly connecting each wheel mounting to a point on each respective section adjacent the wheel mounting, said points being spaced apart and arranged one on each side of the point about which hinging movement of the respective sections takes place so that the respective wheel mounting axis always bisects the angle formed between the respective sections when relative turning movement between these latter in said vertical plane occurs about the hinges connecting the sections.

3. A spraying boom adapted to be carried by a land vehicle so as to project transversely from the latter and comprising in combination a plurality of sections, pinions having horizontal axes arranged at adjacent ends of the respective sections, each pair of pinions meshing with each other to constitute a geared knuckle connecting the respective sections, pivots aligned with the axis of said pinions, an element connecting each respective pair of pivots, a wheel mounting projecting downwardly from each of said elements so that the axis of the wheel mounting is always normal to the line connecting the respective pivot axes, and a ground-engaging wheel carried at the lower end of said wheel mounting.

4. A spraying boom according to claim 2, wherein said hinge means allow sufficient movement between the respective sections to enable said portion of the boom to be folded about said hinge means in the same substantially vertical plane so that the sections lie substantially against each other, alternate hinge means being arranged so that they are opposite in action during said folding movement in which the sections form the sides of transversely collapsing triangles and fold in a zig-zag manner with the wheel mountings lying parallel to the sections when these latter are in the collapsed position.

5. A spraying boom according to claim 1, wherein a truss is arranged between adjacent ends of said sections to project fore and aft of said sections each of which comprises in combination a longitudinal spar, a further truss carried by said spar intermediate its ends and which also projects fore and aft of the spar, bracing members extending substantially diagonally between the portions of said trusses and said further trusses lying on each side of the longitudinal spar, and tensioning means incorporated in said elements so that these latter afford lateral rigidity to the sections in the horizontal plane.

6. A spraying boom according to claim 1, wherein each section comprises a longitudinal spar, a transverse truss arranged at each end of said longitudinal spar to project forwardly and rearwardly on each side of said hinge means, a vertically arranged pivot head at each end of said transverse truss, and a ground-engaging wheel mounted from each of said pivot heads so that the wheels are arranged tandem fashion, said pivot heads imparting a caster action to the wheels.

7. A spraying boom adapted to be carried by a land vehicle so as to project transversely therefrom and comprising in combination a plurality of sections, hinge means connecting adjacent ends of said sections to each other to permit relative movement between said sections only in the common substantially vertical plane containing said sections and confine movement between said sections to said plane, a plurality of ground-engaging wheels to support said sections at said hinge means whereby the boom is enabled generally to follow the land contours over which it is running and remain rigid in the direction of movement of the boom, said hinge means connecting the various sections being constructed so that the boom may also fold about said hinge means in the same said substantially vertical plane to enable the sections to lie substantially against each other, alternate hinge means being arranged so that they are opposite in action during said folding movement during which the sections form the sides of transversely collapsing triangles, and hinged attachment means, adapted to be carried by the vehicle, disposed substantially at the centre of the boom which is arranged so that two substantially similar portions thereof are disposed one on each side of the vehicle, said attachment means being turnable about a horizontal axis arranged transversely of the vehicle so that the collapsed boom can be turned in a vertical longitudinal plane to a stowed position in which it is arranged substantially horizontally over the top of the vehicle for transport purposes, in the manner of a fire escape.

References Cited in the file of this patent

UNITED STATES PATENTS

| | | |
|---|---|---|
| 2,221,433 | Pitner | Nov. 12, 1940 |
| 2,518,952 | Sohmer | Aug. 15, 1950 |
| 2,576,133 | McCarter | Nov. 27, 1951 |
| 2,628,863 | Maggart | Feb. 17, 1953 |

FOREIGN PATENTS

| | | |
|---|---|---|
| 49,631 | Netherlands | Nov. 15, 1940 |
| 1,068,422 | France | Feb. 3, 1954 |